United States Patent Office 2,713,018

O,O-DIALKYL S-(1,2-DICARBALKOXYETHYL) MONOTHIOPHOSPHATES AND MITICIDE COMPOSITIONS CONTAINING THE SAME

Gerald A. Johnson, Stamford, Conn., assignor to American Cyanamid Company, New York, N. Y., a corporation of Maine No Drawing. Application February 18, 1953, Serial No. 337,693

8 Claims. (Cl. 167—22)

This invention relates to organic phosphate esters, and particularly to O,O-dialkyl S-(1,2-dicarbalkoxyethyl) monothiophosphate esters and to miticide compositions containing them.

The principal object of the present invention is to provide a novel series of organic phosphate esters.

Another important object is the provision of novel miticide compositions.

Other objects will become apparent from the following description.

The novel phosphate esters of the present invention comprise the O,O-dialkyl S-(1,2-dicarbalkoxyethyl) monothiophosphates represented by the formula

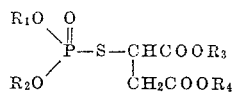

in which $R_1$, $R_2$, $R_3$ and $R_4$ each represent an alkyl radical having from one to four carbon atoms.

These monothiophosphate esters may be prepared by nitric acid oxidation of the O,O-dialkyl S-(1,2-dicarbalkoxyethyl) dithiophosphate esters substantially according to the following equation:

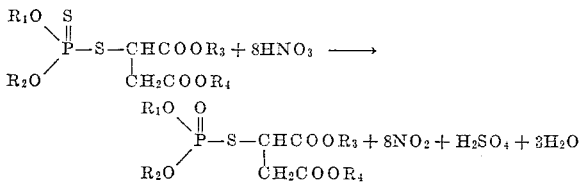

The oxidation of the dithiophosphate esters takes place rapidly and is usually exothermic. The reaction may be effected at temperatures within the range of from about 15°–80° C., and preferably in the range of 25°–40° C. It is also advisable to add the nitric acid portionwise to the dithiophosphate ester and to have some means at hand for cooling the reaction vessel.

Other oxidizing agents which may be employed in the conversion of the dithiophosphate esters to the monothiophosphate esters include hydrogen peroxide, hypochlorous acid, chromic acid, and permanganate in acid or neutral medium.

The O,O-dialkyl S-(1,2-dicarbalkoxyethyl) dithiophosphates which are utilized in the preparation of the compounds of the present invention, may be produced by methods disclosed in U. S. Patent 2,578,652.

The following examples will further illustrate the preparation of the novel compounds of the present invention.

EXAMPLE 1

O,O-dimethyl S-(1,2-dicarbethoxyethyl) monothiophosphate 99.1 g. (0.3 mole) of O,O-dimethyl S-(1,2-dicarbethoxyethyl) dithiophosphate was placed in a 500 cc. three-necked round-bottomed flask fitted with a mechanical glass hook stirrer, a thermometer (immersed in the reaction mixture), and a Y-tube. One neck of the Y-tube was fitted with a dropping funnel for the addition of nitric acid, while the other remained open for the escape of nitrogen dioxide gas. 216 g. (2.4 moles) of nitric acid, sp. gr. 1.42, was added dropwise during a two and one-half hour period while the temperature of the reaction mixture was maintained between 25° and 31° C. The mixture was then stirred for an additional 1.5 hours at 28°–30° C. while nitrogen dioxide continued to be evolved. Finally, the mixture was subjected to reduced pressure (water-pump vacuum) for about two hours to remove the last traces of nitrogen dioxide, and then poured over 500 g. of crushed ice. The yellow oil which separated, was extracted with three 100 cc. portions of ether. After washing the extract with five 50 cc. portions of 10% sodium bicarbonate solution and then with three 50 cc. portions of concentrated sodium chloride solution, it was dried over anhydrous magnesium sulfate and stripped free of solvent at 35° C. and 0.5 mm. pressure. The residual yellow oily liquid, weighing 58.4 g. (62% yield), had a refractive index $n_D^{25}$ 1.4696.

Anal.—Calc'd. for $C_{10}H_{19}O_7PS$: S, 10.20. Found: S, 10.19.

EXAMPLE 2

O,O-diethyl S-(1,2-dicarbomethoxyethyl) monothiophosphate

The procedure of Example 1 was employed using 54 g. (0.164 mole) of O,O-diethyl S-(1,2-dicarbomethoxyethyl) dithiophosphate and 119 g. (1.31 moles) of nitric acid, sp. gr. 1.42. The crude product was extracted with two 50 cc. portions of benzene. 19.8 g. of the monothiophosphate ester was obtained. The product was a clear yellow liquid having a refractive index $n_D^{25}$ 1.4680.

Anal.—Calc'd. for $C_{10}H_{19}O_7PS$: S, 10.20. Found: S, 9.72.

EXAMPLE 3

O,O-dimethyl S-(1,2-dicarbomethoxyethyl) monothiophosphate

The procedure of Example 1 was employed using 58 g. (0.192 mole) of O,O-dimethyl S-(1,2-dicarbomethoxyethyl) dithiophosphate and 139 g. (1.54 moles) of nitric acid, sp. gr. 1.42. The reaction mixture was poured over 100 g. of crushed ice, and the crude product was extracted with three 50 cc. portions of benzene. 19 g. of the monothiophosphate ester was obtained. The product was a pale yellow liquid having a refractive index $n_D^{25}$ 1.4757.

Anal.—Calc'd. for $C_8H_{15}O_7PS$: S, 11.21. Found: S, 10.12.

EXAMPLE 4

O,O-diethyl S-(1,2-dicarbethoxyethyl) monothiophosphate

The procedure of Example 1 was employed using 71.7 g. (0.2 mole) of O,O-diethyl S-(1,2-dicarbethoxyethyl) dithiophosphate and 145 g. (1.6 moles) of nitric acid, sp. gr. 1.42. The reaction mixture was poured over 200 g. of crushed ice, and the crude product was extracted with two 50 cc. portions of benzene. 31 g. of the monothiophosphate ester was obtained. The product was a clear yellow liquid having a refractive index $n_D^{25}$ 1.4630.

Anal.—Calc'd. for $C_{12}H_{23}O_7PS$: S, 9.37. Found: S, 8.73.

EXAMPLE 5

O,O-di-n-propyl S-(1,2-dicarbethoxyethyl) monothiophosphate

The procedure of Example 1 was employed using 77.3 g. (0.2 mole) of O,O-di-n-propyl S-(1,2-dicarbethoxyethyl) dithiophosphate and 145 g. (1.6 moles) of nitric acid, sp. gr. 1.42. The reaction mixture was poured over 300 g. of crushed ice, and the crude product was extracted with two 50 cc. portions of benzene. 45.7 g. (61.8% yield) of the monothiophosphate ester was obtained. The product was a clear yellow liquid having a refractive index $n_D^{25}$ 1.4600.

*Anal.*—Calc'd. for $C_{14}H_{27}O_7PS$: S, 8.66. Found: S, 8.10.

EXAMPLE 6

*O,O-di-n-butyl S-(1,2-dicarbo-n-butoxyethyl) monothiophosphate*

The procedure of Example 1 was employed using 63 g. (0.134 mole) of O,O-di-n-butyl S-(1,2-dicarbo-n-butoxyethyl) dithiophosphate and 97.2 g. (1.073 moles) of nitric acid, sp. gr. 1.42. The reaction mixture was poured over 200 g. of crushed ice, and the crude product was extracted with a solvent consisting of two parts of benzene and one part of toluene. 45.1 g. (74% yield) of the monothiophosphate ester was obtained. The product was a yellow oily liquid having a refractive index $n_D^{25}$ 1.4598.

*Anal.*—Calc'd. for $C_{20}H_{39}O_7PS$: S, 7.05. Found: S, 6.5.

The present O,O-dialkyl S-(1,2-dicarbalkoxyethyl) monothiophosphates are somewhat soluble in many organic liquids including the ketones, namely, acetone, cyclohexanone, isophorone, methyl ethyl ketone, methyl isobutyl ketone and the like; the lower monohydric aliphatic alcohols; ketone alcohols such as diacetone alcohol; various esters, namely, the acetates, phthalates, abietates, fumarates and maleates; and aromatic hydrocarbons such as benzene, toluene and xylene. They are adapted for various uses, more particularly as acaricides, insecticides, antioxidants and petroleum additives. They are of exceptional value as toxic constituents of miticide compositions.

While the monothiophosphate esters of the present invention have been found to be outstanding in the control of mites and larvae and eggs of mites, they are also very effective in controlling such insect pests as aphids, flour beetles, milkweed bugs, german cockroaches and southern army worms. The monothiophosphate esters of Examples 1, 2 and 3 above each gave a 100% kill of aphids at a dilution of 1:100,000 in acetone-water solutions. The monothiophosphate esters of Examples 1, 2, 3 and 4 above also gave a 100% kill of milkweed bugs and german cockroaches in contact with a 1.0% dust (pyrophyllite used as the carrier).

The O,O-dialkyl S-(1,2-dicarbalkoxyethyl) monothiophosphate esters may be compounded with other materials for the preparation of suitable miticide compositions. For example, they may be admixed with talc, pyrophyllite, bentonite or other inert powders or ducts in concentrations of, say, from 0.5 per cent to 5 per cent and the composition thus formed may be applied as a dust to the mite infested plants, shrubs or trees. Aqueous suspensions and emulsions of the monothiophosphate esters may also be employed in combating mites at dilutions of, say, from 1:1,000 to 1:100,000. They may also be compounded with a suitable oil such as pine oil or white mineral oil and applied as an oil spray to the foliage of plants for the purpose of effecting mite control.

The marked activity of the monothiophosphate esters of the present invention in controlling the active stages and eggs of the two-spotted spider mite is illustrated in the table below. Experiments were also made using the corresponding dithiophosphate esters at the same dilutions and these results are given in the table. Each test was carried out as follows: The phosphate compound was dissolved in a solvent medium consisting of 65% acetone and 35% water. The first pair of leaves of a lima bean plant which were infested with two-spotted spider mites were dipped in the test solution for three seconds, drained and allowed to dry. The plant was held in a greenhouse for 48 hours after which counts of living and dead mites on one of the leaves were made under a microscope. The percent kill corrected for check mortality was recorded. The plant was then held in the greenhouse for an additional 5 days after which the other leaf was examined and an estimate made of the percentage of eggs killed.

TABLE

| Compound | Dilution | Two-spotted mite | Percent Kill |
| --- | --- | --- | --- |
| O,O-dimethyl S-(1,2-dicarbethoxyethyl)-monothiophosphate | 1–100,000 | active stages | 100 |
| O,O-dimethyl S-(1,2-dicarbethoxyethyl)-dithiophosphate | 1–100,000 | do | 35.0 |
| O,O-dimethyl S-(1,2-dicarbethoxyethyl)-monothiophosphate | 1–10,000 | eggs | 100 |
| O,O-dimethyl S-(1,2-dicarbethoxyethyl)-dithiophosphate | 1–10,000 | do | 10.0 |
| O,O-diethyl S-(1,2-dicarbomethoxyethyl)-monothiophosphate | 1–10,000 | active stages | 99.0 |
| O,O-diethyl S-(1,2-dicarbomethoxyethyl)-dithiophosphate | 1–10,000 | do | 68.3 |
| O,O-diethyl S-(1,2-dicarbomethoxyethyl)-monothiophosphate | 1–10,000 | eggs | 99.0 |
| O,O-diethyl S-(1,2-dicarbomethoxyethyl)-dithiophosphate | 1–10,000 | do | 0 |
| O,O-dimethyl S-(1,2-dicarbomethoxyethyl)-monothiophosphate | 1–10,000 | active stages | 82.2 |
| O,O-dimethyl S-(1,2-dicarbomethoxyethyl)-dithiophosphate | 1–10,000 | do | 8.0 |
| O,O-dimethyl S-(1,2-dicarbomethoxyethyl)-monothiophosphate | 1–1,000 | eggs | 100 |
| O,O-dimethyl S-(1,2-dicarbomethoxyethyl)-dithiophosphate | 1–1,000 | do | <25.0 |

The results given in the above table clearly illustrate the superiority of the monothiophosphate esters over the corresponding dithiophosphate esters in the control of mites and their eggs.

The compounds of the present invention are characterized also by a pleasant, fragrant aroma in contrast to the corresponding dithiophosphate esters and many other known thiophosphates which have displeasing and disagreeable odors. Thus, the present monothiophosphate esters may be advantageously employed in the household, for example in fly sprays, and in suitable solvents for the impregnation of textiles, and particularly articles of clothing, to provide insect repellency in such articles.

While the invention has been described with particular reference to specific embodiments, it is to be understood that it is not to be limited thereto but is to be construed broadly and restricted solely by the scope of the appended claims.

I claim:

1. A monothiophosphate ester of the general formula

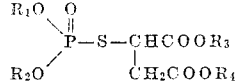

in which $R_1$, $R_2$, $R_3$ and $R_4$ each represent an alkyl radical having from one to four carbon atoms.

2. O,O-dimethyl S-(1,2-dicarbethoxyethyl) monothiophosphate.

3. O,O-diethyl S-(1,2-dicarbomethoxyethyl) monothiophosphate.

4. O,O-dimethyl S-(1,2-dicarbomethoxyethyl) monothiophosphate.

5. A miticide composition comprising an inert carrier and as an essential active ingredient a monothiophosphate ester of the general formula

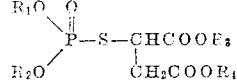

in which $R_1$, $R_2$, $R_3$ and $R_4$ each represent an alkyl radical having from one to four carbon atoms.

6. A miticide composition comprising an inert carrier and O,O-dimethyl S-(1,2-dicarbethoxyethyl) monothiophosphate as an essential active ingredient.

7. A miticide composition comprising an inert carrier and O,O-diethyl S-(1,2-dicarbomethoxyethyl) monothiophosphate as an essential active ingredient.

8. A miticide composition comprising an inert carrier and O,O-dimethyl S-(1,2-dicarbomethoxyethyl) monothiophosphate as an essential active ingredient.

References Cited in the file of this patent

UNITED STATES PATENTS

| | | |
|---|---|---|
| 2,494,126 | Hoegberg | Jan. 10, 1950 |
| 2,494,283 | Cassaday et al. | Jan. 10, 1950 |
| 2,494,284 | Cassaday et al. | Jan. 10, 1950 |
| 2,578,652 | Cassaday | Dec. 18, 1951 |
| 2,645,657 | Rudel et al. | July 14, 1953 |